(12) United States Patent
Feather

(10) Patent No.: US 9,253,230 B2
(45) Date of Patent: Feb. 2, 2016

(54) REDUCING LATENCY IN MULTIPLE UNICAST TRANSMISSIONS

(75) Inventor: Clive Douglas Woon Feather, Cambridge (GB)

(73) Assignee: Qualcomm Technologies International, Ltd., Cambridge (GB)

( * ) Notice: Subject to any disclaimer, the term of this patent is extended or adjusted under 35 U.S.C. 154(b) by 309 days.

(21) Appl. No.: 13/599,367

(22) Filed: Aug. 30, 2012

(65) Prior Publication Data

US 2014/0064175 A1 Mar. 6, 2014

(51) Int. Cl.
*H04L 29/06* (2006.01)
*H04N 21/6405* (2011.01)

(52) U.S. Cl.
CPC .......... *H04L 65/4076* (2013.01); *H04L 65/607* (2013.01); *H04L 65/80* (2013.01); *H04L 65/608* (2013.01); *H04N 21/6405* (2013.01)

(58) Field of Classification Search
CPC . H04L 65/4076; H04L 65/607; H04L 1/0083; H04L 2001/0093; H04L 29/06027; H04L 65/608; H04N 21/6125
USPC .......... 370/312, 216, 231; 709/231, 219, 205, 709/244; 375/240
See application file for complete search history.

(56) References Cited

U.S. PATENT DOCUMENTS

| | | | | |
|---|---|---|---|---|
| 2009/0290541 | A1* | 11/2009 | Nishio | 370/328 |
| 2010/0166053 | A1* | 7/2010 | Fukuhara et al. | 375/240.01 |
| 2010/0254392 | A1* | 10/2010 | Katar et al. | 370/400 |
| 2010/0306401 | A1* | 12/2010 | Gilson | 709/231 |
| 2011/0150418 | A1* | 6/2011 | Chasen | 386/239 |
| 2013/0097287 | A1* | 4/2013 | Shauh et al. | 709/219 |

FOREIGN PATENT DOCUMENTS

EP 2262260 12/2010
WO WO 2013/056076 4/2013

OTHER PUBLICATIONS

Baik et al., Delivery in LTE eMBMS Traffic, 2012.*
Search Report for GB Appln. No. 1217081.7, dated Feb. 27, 2014.

* cited by examiner

*Primary Examiner* — Un C Cho
*Assistant Examiner* — Oussama Roudani
(74) *Attorney, Agent, or Firm* — Procopio, Cory, Hargreaves & Savitch LLP

(57) ABSTRACT

A transmitter for transferring a data stream to multiple receivers, the transmitter being configured to sample a first portion of the data stream to form a first sample dataset, encode the first sample set to form a first encoded dataset and transmit the first encoded dataset to a first one of the receivers; sample a second portion of the data stream to form a second sample dataset, encode the second sample set to form a second encoded dataset and transmit the second encoded dataset to a second one of the receivers; and to perform at least part of the step of sampling the second portion of the datastream while the first sample dataset is being encoded or the first encoded dataset is being transmitted.

20 Claims, 8 Drawing Sheets

REDUCING LATENCY IN MULTIPLE UNICAST TRANSMISSIONS

FIELD OF THE DISCLOSURE

The present invention relates to reducing latency in multiple unicast transmissions.

BACKGROUND

On a communication network, data that needs to be sent to multiple receiver devices may be sent via broadcast, multicast or unicast mechanisms. In a broadcast transmission, data is directed to all devices on the network. A potential problem with broadcasting is that the data is delivered (or attempted to be delivered) to all devices on the network, regardless of the number of intended recipient devices. This can lead to difficulties in that, for example, devices for which the transmission was not intended may still consume power decoding the broadcast transmission.

A second possibility for transmitting data is unicasting. In unicasting, data is sent to the receiver devices individually, that is, each device is individually addressed. This means that if the same data is to be sent to multiple devices, the data must be copied and sent to each device in turn. The requirement of copying the data for each device means that unicasting can become very inefficient and bandwidth intensive when the number of receiver devices is large.

A multicast transmission is one in which data is directed to a sub-group of devices within a communication network. The devices belonging to a particular sub-group may be identified by an address unique to that group. Unlike in broadcasting, multicasting does not require that data be directed to every device on the network. This leads to a reduction in redundant transmissions. Multicasting has the advantage over unicasting in that only a single copy of the data is sent from the transmitting device, regardless of the number of receiver devices.

In a network in which data is sent via routers, multicasting is more efficient than broadcasting because the routers will only direct the data to areas in which the intended recipients lie. Multicasting thus includes the advantages of both unicast and broadcast, and is often employed in multimedia applications such as video conferencing and internet radio.

FIG. 1 illustrates the stages of a unicast transmission. A source data stream 101 is sampled for a time $T_S$. The sampled portion is then encoded by an encoding operation 102 to produce an encoded portion. The encoded portion is a discrete packet of data. The size of the packet determines the duration of the portion of the source data stream that can be encoded. The maximum size of the data packet that can be transmitted will depend on the protocol being used by the communication network. The encoding operation takes time $T_E$. The encoded portion is then transmitted to a receiver device by a transmitting operation 103 to produce a transmitted portion. The transmitting operation takes time $T_T$. Once the transmitted portion is received by the receiver device, it is decoded by a decoding operation 104 to produce a decoded portion. The decoding operation takes time $T_D$. The latency for this transmission is the time taken from the beginning of the sampling of the source data stream portion through to the end of the decoding operation 104.

Bluetooth is a technology standard that allows wireless communication between devices. It allows several devices to be connected on a network known as a piconet. A communication network using Bluetooth will normally consist of a "master" device and one or more "slave" devices. A master device can only transmit data packets to a slave device in designated "master-to-slave" time slots, and similarly, a slave can only transmit data packets to the master in designated "slave-to-master" time slots. An advantage of Bluetooth is that data packets from the master to the slave can be re-transmitted until an acknowledgement of receipt from the slave is received by the master device. This leads to a reliable transmission of data between devices. A potential problem with Bluetooth is that multicast transmission is not supported. A master can either communicate with a slave device via a unicast transmission or via a broadcast transmission. In a broadcast transmission, data is transmitted from the master device to every slave device on the network. This can be efficient in that data can be sent to all the slave devices with a single transmission, however, slave devices cannot acknowledge receipt of a broadcast transmission, so the master does not know if an individual slave device has received the broadcast message correctly. If it is desirable to transmit a data packet reliably to a sub-group of slave devices on a network, it is necessary to send a unicast transmission to each of the slave devices in turn. This advantageously allows for an acknowledgement of receipt to be sent from each slave device.

In an example of a unicast transmission on a Bluetooth network, and referring to the time interval in FIG. 1, the transmission time $T_T$ represents the time required for the relevant master-to-slave and slave-to-master time slots. The latency time $T_L$ for the data packet transmission involving sampled data is given by:

$$T_L = T_S + T_E + T_T + T_D$$

where $T_S$ is the time required to sample the data, $T_E$ is the time required to encode the data, $T_T$ is the time required to transmit the data and $T_D$ is the time required to decode the data.

FIG. 1 illustrates a packet representing just one portion of a source data stream being transmitted. In practice, it is likely that multiple packets representing multiple portions of the source data stream will need to be transmitted.

FIG. 2a shows the stages of a unicast transmission of packets representing succeeding portions of a data stream 201. A first portion 202 of the data stream is sampled for a time $T_{S1}$. The portion 202 is encoded by a first encoding operation 203 to produce a first encoded portion, or packet. The encoding operation 203 takes time $T_{E1}$. The first encoded portion is transmitted by a first transmitting operation 204 to produce a first transmitted portion. The transmitting operation 204 takes time $T_{T1}$. A second portion 205 of the data stream is sampled after the sampling of the first portion is complete. The second portion is sampled for time $T_{S2}$. Once the second portion has been sampled it is encoded by a second encoding operation 206 to produce a second encoded portion, or packet. The encoding operation 206 takes time $T_{E2}$. The second encoded portion is transmitted by a second transmitting operation 207 to produce a second transmitted portion. The transmitting operation 207 takes time $T_{T2}$.

It will often be desirable for the data rate of the source data stream itself to be less than or equal to the average rate at which the source data is received at the receiver device. This is particularly true when the data stream is an audio or video stream. FIG. 2a illustrates a unicast transmission that satisfies this condition. FIG. 2b shows the stages of a unicast transmission where the data rate of the source data stream is greater than the average rate at which data is received at the receiver device.

In FIG. 2b, a first portion 210 of the source data stream 201 is sampled for a time $T_S$. The portion 210 is encoded by a first encoding operation 211 to produce a first encoded portion, or packet. The encoding operation 211 takes time $T_E$. The first encoded portion is transmitted by a first transmitting operation 212 to produce a first transmitted portion. The transmitting operation 212 takes time $T_T$. Once the transmitted portion is received by the receiver device, it is decoded by a first decoding operation 216 to produce a first decoded portion. A second portion 213 of the data stream is sampled after the sampling of the first portion is complete. The second portion is sampled for time $T_S$. Once the second portion has been sampled it is encoded by a second encoding operation 214 to produce a second encoded portion, or packet. The encoding operation 214 takes time $T_E$. The second encoded portion is transmitted by a second transmitting operation 215 to produce a second transmitted portion. The transmitting operation 207 takes time $T_T$. Once the transmitted portion is received by the receiver device, it is decoded by a second decoding operation 217 to produce a second decoded portion.

Referring to FIG. 2b, the time between the completion of successive decoding operations is given by $T_{SD}=T_E+T_T$. If, for example, the source data stream were an audio or video stream, once the decoding operation 216 was complete the receiver device could play the first portion 210 of the audio or video stream. The duration of the audio/video stream that the receiver could play would be equal to the sampling time $T_S$. The receiver cannot begin to play the succeeding portion 213 of the audio/video stream until the decoding operation 217 has been completed. Hence if $T_S < T_{SD}$ the receiver device would have finished playing the first portion of the audio/video stream before it could begin playing the succeeding portion 213. This would introduce unwanted time delays into the audio/video stream when being played by the receiver device.

In some transmitting devices it may be possible for the encoding and transmitting operations to overlap in time. The degree of overlap is constrained by the requirement that the second transmission operation cannot begin until the first transmission operation has been completed. This is a requirement of unicast transmissions over a shared link. If the encoding and transmitting operations are to overlap, and it is desired for the data rate of the source data stream to be less than the average rate at which the source data is received at the receiver device then the sampling time $T_S$ should satisfy both of the following conditions:

$$T_S > T_E$$

$$T_S > T_T$$

Conversely if the encoding and transmitting operations are not to overlap and it is desired for the data rate of the source data stream to be less than the average rate at which the source data is received at the receiver device then the sampling time $T_S$ should satisfy the following condition:

$$T_S > T_E + T_T$$

In some receiving devices it may be possible for the receiver to begin to decode the transmitted portion before the entirety of the transmitted portion is received. If the decoding and transmission operations are to overlap, and it is desired for the data rate of the source data stream to be less than the average rate at which the source data is received at the receiver device then the sampling time $T_S$ should satisfy both of the following conditions:

$$T_S > T_T$$

$$T_S > T_D$$

Conversely if the decoding and transmitting operations are not to overlap and it is desired for the data rate of the source data stream to be less than the average rate at which the source data is received at the receiver device then the sampling time $T_S$ should satisfy the following condition:

$$T_S > T_T + T_D$$

FIG. 3 shows the stages of multiple unicast transmissions used to transmit source data to multiple receiver devices. For clarity FIG. 3 illustrates unicast transmission of only one portion of a source data stream 301. A portion 302 of the source data stream is sampled for a time $T_S$. The sampled portion is then encoded by an encoding operation 303 to produce an encoded portion, or packet. The encoding operation takes time $T_E$. The encoded portion is then transmitted to each receiver device in turn by respective transmitting operations 304, 305, 306. The first transmission operation 304 transmits the encoded portion to a first receiver device and takes time $T'_m$. The second transmission operation 305 transmits the encoded portion to a second receiver device and takes time $T_{T2}$. The third transmission operation 306 transmits the encoded portion to a third receiver device and takes time $T_{T3}$. The first transmitted portion is decoded at the first receiver device by a first decoding operation 307. The operation 307 takes time $T_{D1}$. The second transmitted portion is decoded at the second receiver device by a second decoding operation 308. The operation 308 takes time $T_{D2}$. The third transmitted portion is decoded at the third receiver device by a third decoding operation 309. The operation 309 takes time $T_{D3}$.

In the example of FIG. 3 the source data is transmitted to three receiver devices. In a practice a multiple unicast transmission could be to any number of receiver devices. In an example of a transmitter device carrying out multiple unicast transmissions the encoding operation may overlap with the transmitting operations. If the operations do overlap and it is desirable for the data rate of the source data stream to be less than the average rate at which the source data is received at the receiver device, the duration of the sampled portion must be longer than the sum of the transmission times and the encoding time. Expressed mathematically, it is preferable that both the following conditions are satisfied:

$$T_S > T_{T1} + T_{T2} + T_{T3}$$

$$T_S > T_E$$

If instead there is no overlap between the encoding and transmitting operations and it is desirable for the data rate of the source data stream to be less than the average rate at which the source data is received at the receiver device, it is required that:

$$T_S > T_{T1} + T_{T2} + T_{T3} + T_E$$

If the receiver device can begin decoding the transmitted portion before the entirety of the transmitted portion is received, that is, the decoding and transmission operations are to overlap, and it is desired that the data rate of the source data stream is less than the average rate at which the source data is received at the receiver device, the following conditions should be satisfied:

$$T_S > T_{T1} + T_{T2} + T_{T3}$$

$$T_S > T_D$$

Conversely if the decoding and transmitting operations are not to overlap and it is desired that the data rate of the source data stream is less than the average rate at which the source data is received at the receiver device, the sampling time $T_S$ should satisfy the following condition:

$$T_S > T_{T1} + T_{T2} + T_{T3} + T_D$$

Transmitting the encoded portion to each of the receiver devices in turn means that the latency associated with each receiver device will be different. For example, the latency associated with transmitting data to the third receiver device, $T_{L3}$ includes the time taken to transmit the encoded data to the first and second receiver devices, given by $T_{T1}$ and $T_{T2}$ respectively. It is given by the expression:

$$T_{L3}=T_S+T_E+T_{T1}+T_{T2}+T_{T3}+T_{D3}$$

It is apparent that increasing the number of receiver devices causes the worst case latency to increase. The latencies associated with each receiver device will also be different, and so each receiver device will be operating at a different level of performance. Furthermore as the number of receiver devices increases the time taken to transmit the encoded portion to all of the receiver devices will increase. This means that if it is desirable for the data rate of the source data stream to be less than the average rate that the source data is received at the receiver devices the duration of the sampled portion of the source data must also be increased. This could lead to the situation where very large data packets have to be transmitted or to a situation where the required size of the data packet is larger than that available with the technology implemented on the communication network.

There is thus a need for an improved method of multiple unicast transmissions that reduces the worst case latency.

SUMMARY OF INVENTION

According to one aspect of the present invention there is provided a transmitter for transferring a data stream to multiple receivers, the transmitter being configured to: sample a first portion of the data stream to form a first sample dataset, encode the first sample dataset to form a first encoded dataset and transmit the first encoded dataset to a first one of the receivers; sample a second portion of the data stream to form a second sample dataset, encode the second sample dataset to form a second encoded dataset and transmit the second encoded dataset to a second one of the receivers; and to perform at least part of the step of sampling the second portion of the datastream whilst the first sample dataset is being encoded or the first encoded dataset is being transmitted.

Suitably the start of the second portion of the datastream is located within the first portion of the datastream.

Preferably each said portion of the datastream is a continuous portion.

Preferably the transmitter is configured to, subsequent to the step of sampling the second portion of the datastream: sample a third portion of the data stream to form a third sample dataset, encode the third sample dataset to form a third encoded dataset and transmit the third encoded dataset to the first one of the receivers; sample a fourth portion of the data stream to form a fourth sample dataset, encode the fourth sample dataset to form a fourth encoded dataset and transmit the fourth encoded dataset to the second one of the receivers.

Suitably the transmitter is configured to perform at least part of the step of sampling the third portion of the datastream whilst the second sample dataset is being encoded or the second encoded dataset is being transmitted.

Suitably the transmitter is configured to perform at least part of the step of sampling the fourth portion of the datastream whilst the third sample dataset is being encoded or the third encoded dataset is being transmitted.

Suitably the third portion of the datastream overlaps the second portion.

Suitably the fourth portion of the datastream overlaps the third portion.

Preferably the third portion of the datastream starts at the end of the first portion of the datastream and the fourth portion of the datastream starts at the end of the second portion of the datastream.

Preferably the transmitter is configured to transmit the encoded datasets by unicast transmissions.

Preferably the transmitter operates in accordance with a protocol in which a receiver of one of the unicast transmissions can indicate whether it has received that unicast transmission correctly.

Suitably the transmitter is configured to transmit the datastream to n receivers and the duration of each portion of the datastream is at least equal to the time taken by the transmitter to transmit an encoded sampled dataset representing a portion of that duration to all n receivers.

Preferably the transmitter is capable of sampling the datastream according to multiple sampling methods and/or encoding sampled datasets according to multiple sampling methods and is configured to select a sampling method and/or an encoding method for use in order that the duration of each portion of the datastream is at least equal to the time taken by the transmitter to transmit an encoded sampled dataset representing such a portion to all n receivers.

According to another aspect of the present invention there is provided a transmitter for transferring multiple data streams to multiple receivers, the transmitter being configured to: sample a first portion of a first data stream to form a first sampled dataset, encode the first sample dataset to form a first encoded dataset and transmit the first encoded dataset to a first one of the receivers; sample a second portion of a second data stream to form a second sampled dataset, encode the second sample dataset to form a second encoded dataset and transmit the second encoded dataset to a second one of the receivers; and to perform at least part of the step of sampling the second portion of the second data stream whilst the first sample dataset is being encoded or the first encoded dataset is being transmitted.

Preferably the transmitter is configured to, subsequent to the step of sampling the second portion of the second data stream: sample a third portion of the first data stream to form a third sample dataset, encode the third sample dataset to form a third encoded dataset and transmit the third encoded dataset to the first one of the receivers; sample a fourth portion of the second data stream to form a fourth sample dataset, encode the fourth sample dataset to form a fourth encoded dataset and transmit the fourth encoded dataset to the second one of the receivers.

Suitably the transmitter is configured to perform at least part of the step of sampling the third portion of the data stream whilst the second sample dataset is being encoded or the second encoded dataset is being transmitted.

Suitably the transmitter is configured to perform at least part of the step of sampling the fourth portion of the datastream whilst the third sample dataset is being encoded or the third encoded dataset is being transmitted.

Suitably the third portion and the second portion overlap in time.

Suitably the fourth portion and the third portion overlap in time.

Preferably the third portion of the first datastream starts at the end of the first portion of the first datastream and the fourth portion of the second datastream starts at the end of the second portion of the second datastream.

BRIEF DESCRIPTION OF DRAWINGS

The present invention will now be described by way of example with reference to the following drawings. In the drawings.

DETAILED DESCRIPTION

In existing methods of multiple unicast transmission the worst case latency increases as the number of receiver devices increases. The method described below provides a means of reducing the latency associated with additional receiver devices by encoding individual parts of the source data stream multiple times, the data encoded in each encoding operation being offset in in the source data stream relative to the preceding encoding operation.

Figure 1:
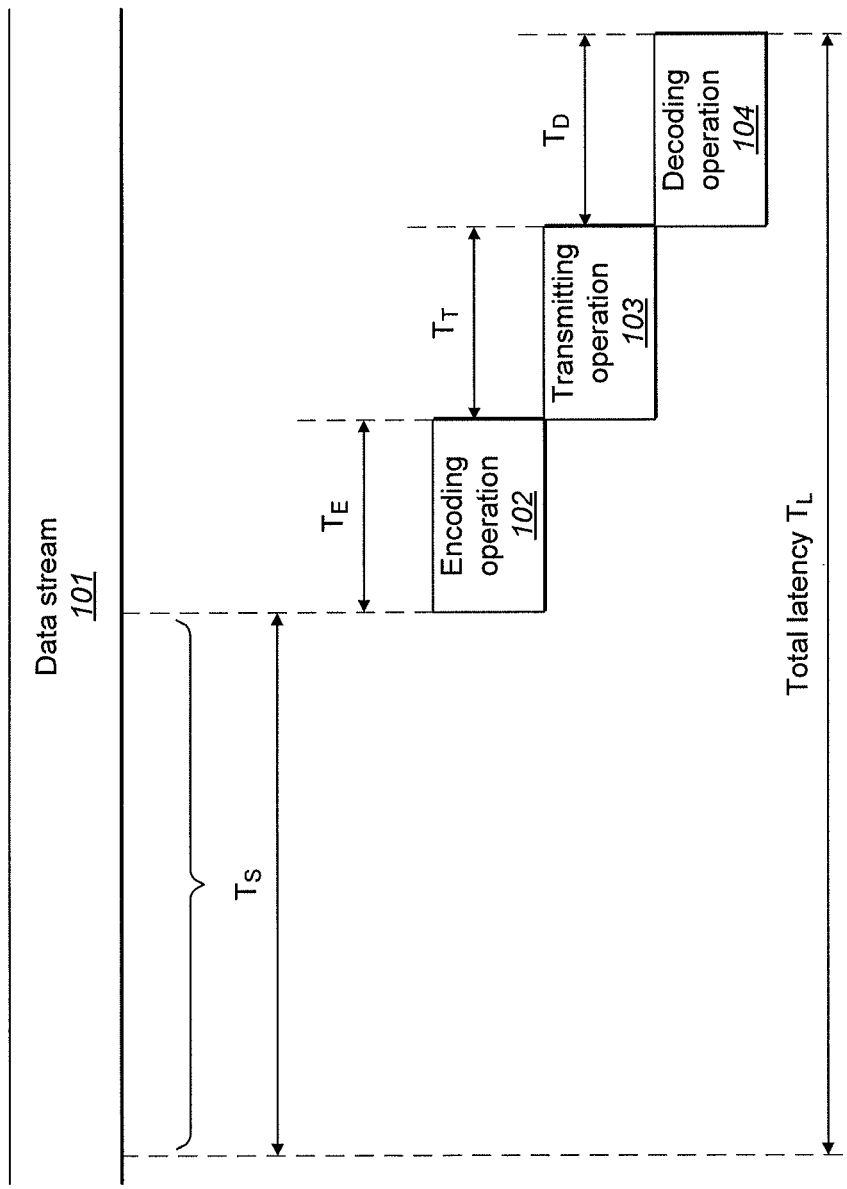
FIG. 1 shows an example of a unicast transmission sequence of a single portion of a data stream to a single receiver device.
Figure 2A:
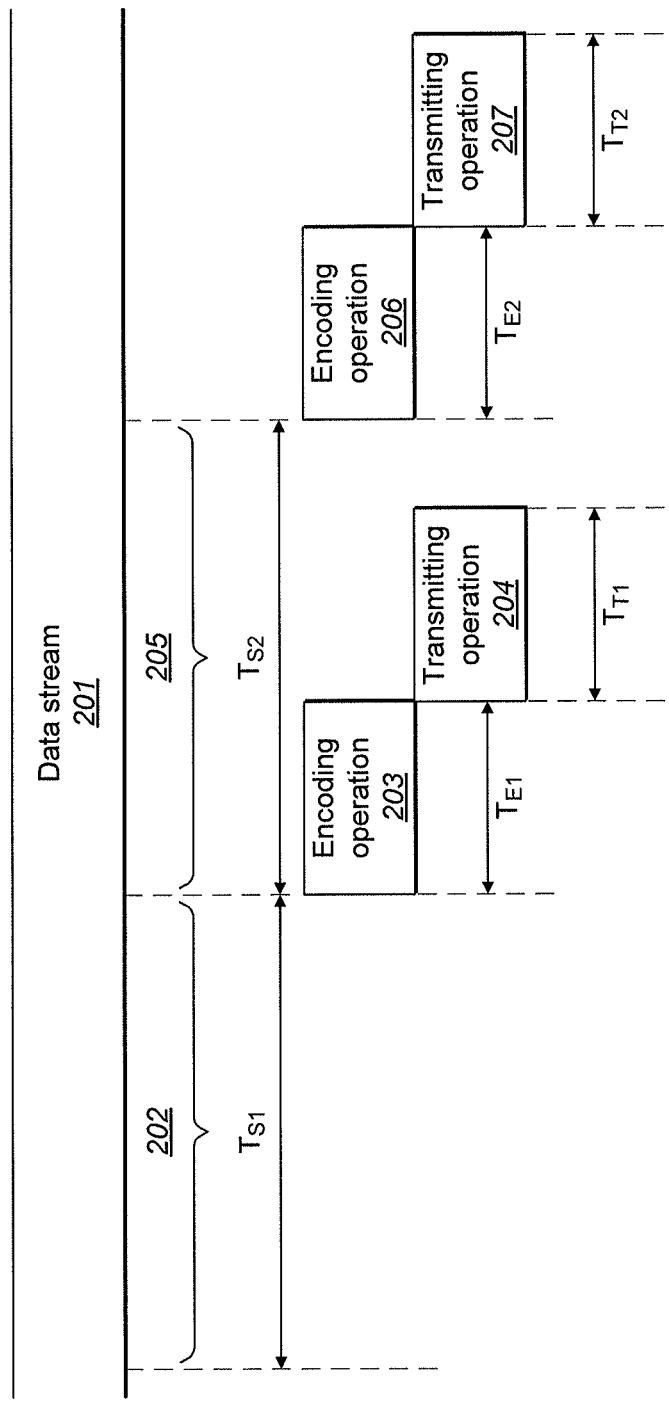
FIGS. 2A and 2B show an example of a unicast transmission sequence of two successive portions of a data stream to a single receiver device.
Figure 2B:
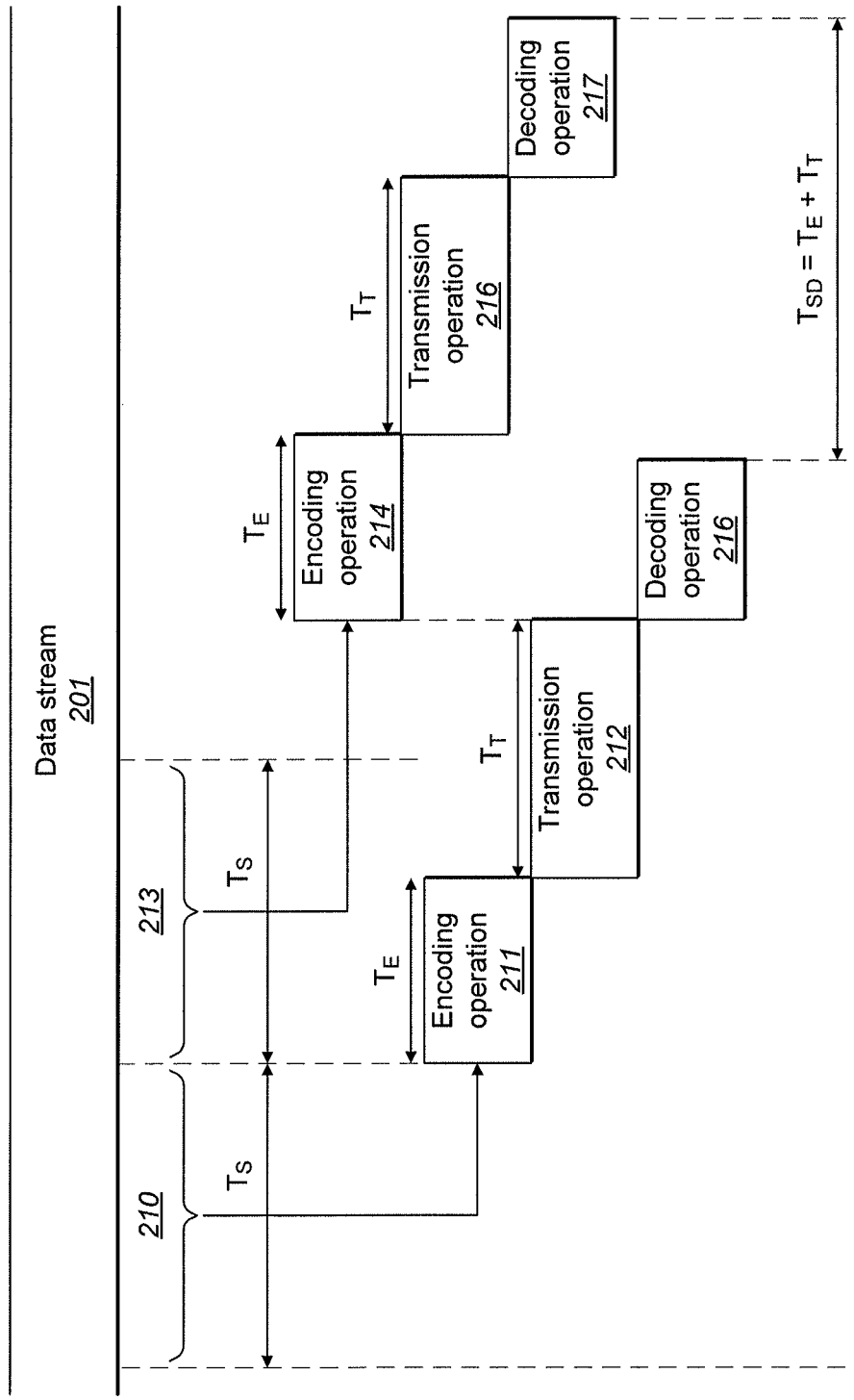
Figure 3:
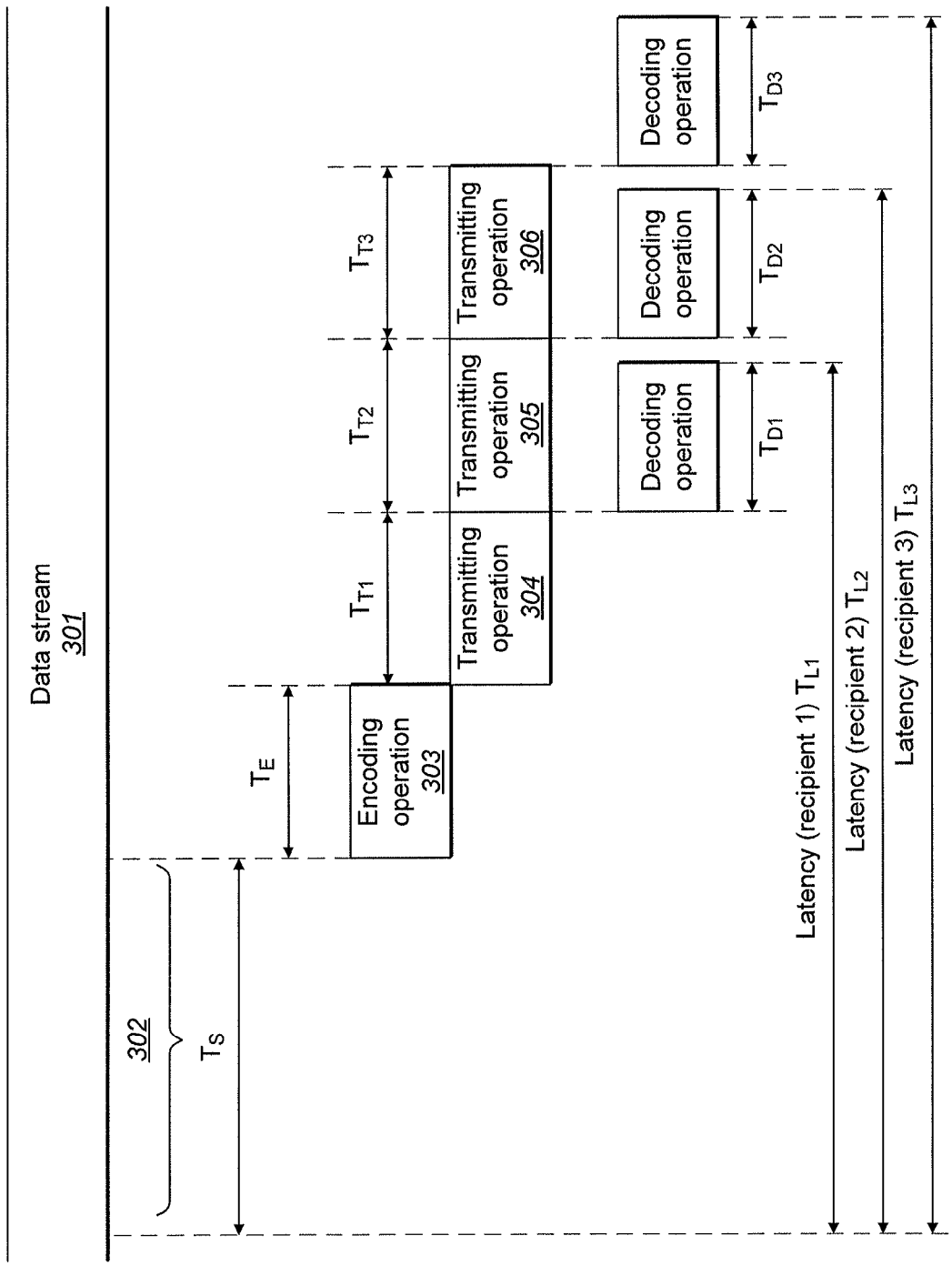
FIG. 3 shows an example of a multiple unicast transmission sequence of a single portion of a data stream to multiple receiver devices.
Figure 4:
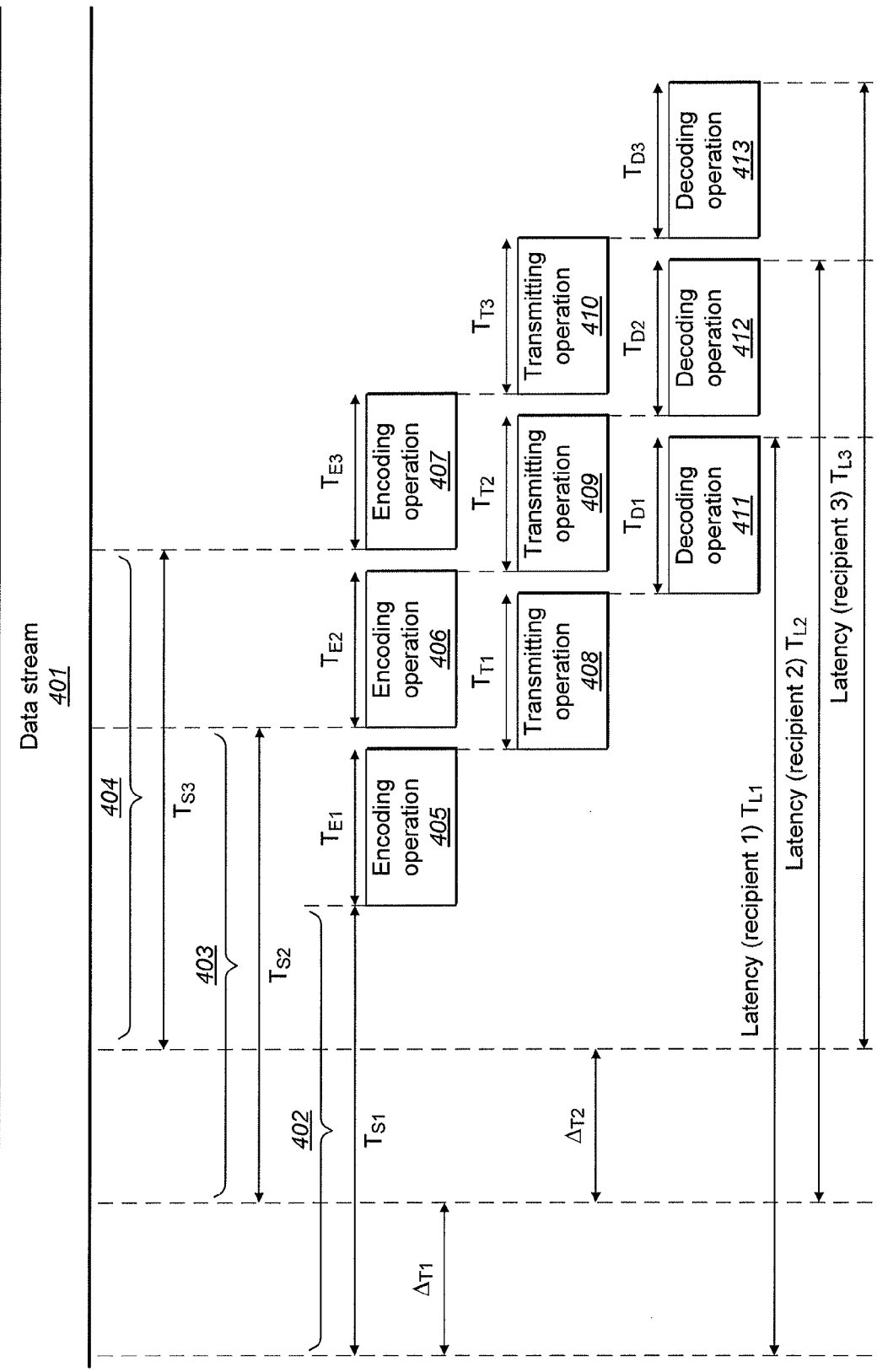
FIG. 4 shows an example of a multiple unicast transmission sequence according to the present invention.

FIG. 4 is an example of such a multiple unicast transmission sequence. As will be described below, this transmission sequence is used to transmit at least one portion of a source data stream 401 to multiple receiver devices. A first portion 402 of the source data stream is sampled in time $T_{S1}$. A second portion 403 of the source data stream, whose start is offset from the start of the first portion by a time $\Delta T_1$, is sampled in time $T_{S2}$. $\Delta T_1$ could be less than $T_{S1}$ so the first portion of the source data stream could overlap the second portion of the source data stream. A third portion 404 of the source data stream, offset from the second portion by a time $\Delta T_2$, is sampled in time $T_{S3}$. Once the sampling of the first portion is complete, the first sampled portion is encoded by a first encoding operation 405 to produce a first encoded portion, or packet. The operation 405 takes time $T_{E1}$. Once the sampling of the second portion is complete, the second sampled portion is encoded by a second encoding operation 406 to produce a second encoded portion, or packet. The operation 406 takes time $T_{E2}$. Once the sampling of the third portion is complete, the third sampled portion is encoded by a third encoding operation 407 to produce a third encoded portion, or packet. The operation 407 takes time $T_{E3}$. The first encoded portion is transmitted by a transmitting operation 408 to a first receiver device, which takes $T_{T1}$. The second encoded portion is transmitted by a second transmitting operation 409 to a second receiver device, which takes time $T_{T2}$. The second transmission operation takes place after the first transmission operation. The third encoded portion is transmitted by a third transmitting operation 410 to a third receiver device, which takes time $T_{T3}$. The third transmitting operation takes place after the second transmission operation. The first transmitted portion is decoded at the first receiver device by a first decoding operation 411. The operation 411 takes time $T_{D1}$. The second transmitted portion is decoded at the second receiver device by a second decoding operation 412. The operation 412 takes time $T_{D2}$. The third transmitted portion is decoded at the third receiver device by a third decoding operation 413. The operation 413 takes time $T_{D3}$.

In practice a multiple unicast transmission according to the present invention could be to any number of receiver devices. The encoding and transmission operations may partially or fully overlap in time. The value of the time offsets between successive sampled portions of the source data stream may vary between successive sampled portions. The duration of the sampled portions of the data stream may vary between successive sampled portions. The transmitted portions may be received by the receiver device but decoded at a separate device. The sampling and encoding operations may occur on separate devices. The encoding operation and transmitting operation may occur on separate devices.

In practice "encoding" and "decoding" a portion of the data stream may be trivial operations, for example there could be situations when the data stream is already in the correct format for transmission. In these situations the "sampling" operation may be simply delineating the block of data to transmit. In other situations the "sampling", "encoding" and "decoding" operations may be more complex, for example the data stream may be an analogue signal and the "sampling" operation may include an analogue-to-digital conversion. The present invention is in no-way limited by the triviality of any of the "sampling", "encoding", "transmission" or "decoding" operations. Various types of encoding operation are applicable to the present invention, for example Non-return-to-zero level (NRZ-L), Bipolar-AMI or Manchester schemes.

FIG. 4 illustrates how encoding portions of a source data stream separately for each receiver device, with a time offset between each encoding operation, can be used to reduce the latency associated with transmitting data to receiver devices in multiple unicast transmissions. In an example implementation the value of each time offset $\Delta T_n$ between successive sampled portions of the source data stream can be adjusted such that the latency associated with each of the receiver devices is the same. The particular values of each of the time offsets required to achieve this effect will depend upon the time taken for the various encoding, transmitting and decoding operations. In the situation where the respective encoding, transmission and decoding times for each of the receiver devices are equal, the latency associated with each receiver device will be equal if $\Delta T_n = \Delta T_{n+1}$.

Figure 5:
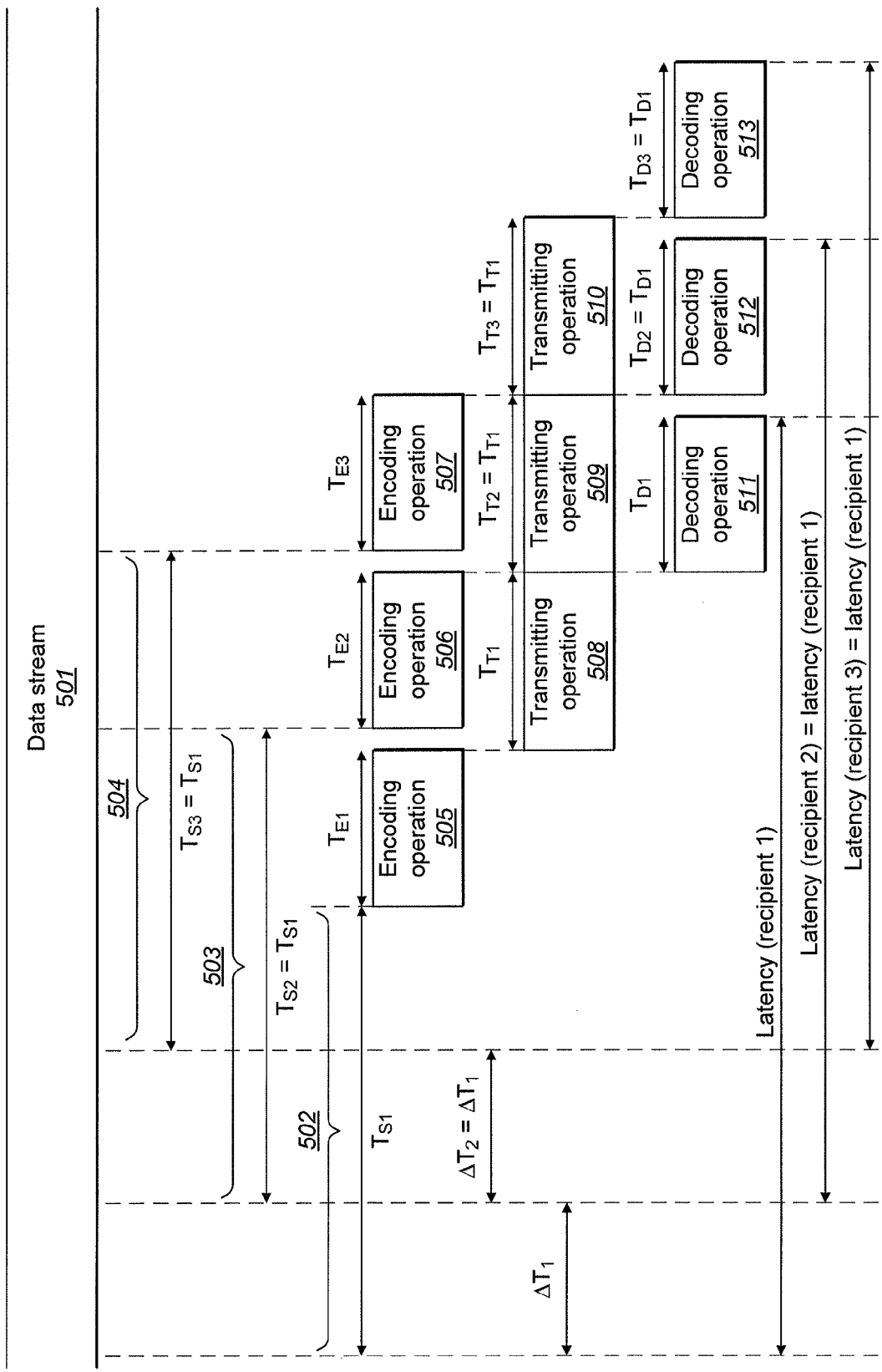
FIG. 5 shows an example implementation of a multiple unicast transmission sequence according to the present invention such that the worst case latency is reduced.

In an ideal implementation the time offsets between successive sampled portions of the source data stream may be adjusted such that the latency associated with each of the multiple receiver devices will be equal to the latency that would be present if there was just one receiver device. If the receivers have different decoding times associated with them, the time offsets can be adjusted such that the latency associated with the multiple receiver devices will be equal to the maximum of the individual latencies that would occur if each receiver device were the only device. In situations in which the transmission operations take longer than encoding operations the time offsets are adjusted such that a transmission operation of an encoded portion begins immediately after the completion of a previous transmission operation. Such a scenario is shown in FIG. 5. Adjustments to the time offsets such that a transmission operation of an encoded operation begins immediately after the completion of a previous transmission operation are also applied to situations in which the encoding operation takes longer than the transmission operation, but two or more encoding operations can overlap. In situations where the encoding operation takes longer than the transmission operation but encoding operations cannot overlap, the time offsets can be adjusted such that an encoding operation of a sampled portion begins immediately after the completion of a previous encoding operation.

An example of an ideal implementation of a multiple unicast transmission sequence according to the present invention is shown in FIG. 5.

The transmission sequence is used to transmit at least one portion of a source data stream 501 to three receiver devices. A first portion 502 of the source data stream is sampled in time $T_{S1}$. A second portion 503 of the source data stream, offset from the first portion by a time $\Delta T_1$, is sampled in time $T_{S2}=T_{S1}$. A third portion 504 of the source data stream, offset from the second portion by a time $\Delta T_2=\Delta T_1$, is sampled in time $T_{S3}=T_{S1}$. The first sampled portion could overlap with the second sampled portion. The first sampled portion could overlap with the third sampled portion. The second sampled portion could overlap with the third sampled portion. Once the sampling of the first portion is complete, the first sampled portion is encoded by a first encoding operation 505 to produce a first encoded portion, or packet. The operation 505 takes time $T_{E1}$. Once the sampling of the second portion is complete, the second sampled portion is encoded by a second encoding operation 506 to produce a second encoded portion, or packet. The operation 506 takes time $T_{E2}=T_{E1}$. Once the sampling of the third portion is complete, the third sampled portion is encoded by a third encoding operation 507 to produce a third encoded portion, or packet. The operation 507 takes time $T_{E3}=T_{E1}$. The first encoded portion is transmitted by a transmitting operation 508 to a first receiver device, which takes $T_{T1}$. The second encoded portion is transmitted by a second transmitting operation 509 to a second receiver device, which takes time $T_{T2}=T_{T1}$. The second transmission operation takes place after the first transmission operation. The third encoded portion is transmitted by a third transmitting operation 510 to a third receiver device, which takes time $T_{T3}=T_{T1}$. The third transmitting operation takes place after the second transmission operation. The first transmitted portion is decoded at the first receiver device by a first decoding operation 511. The operation 511 takes time $T_{D1}$. The second transmitted portion is decoded at the second receiver device by a second decoding operation 512. The operation 512 takes time $T_{D2}=T_{D1}$. The third transmitted portion is decoded at the third receiver device by a third decoding operation 513. The operation 513 takes time $T_{D3}=T_{D1}$. In this example the duration of the transmitting operation, $T_T$, is greater than the duration $T_E$ of the encoding operation, and so $\Delta T_1=T_{T1}$. This time offset between data stream portions is chosen so that the transmission operations are temporally concatenated. If the duration of the encoding operation $T_E$ is greater than the duration of the transmitting operation $T_T$, then $\Delta T_1$ would equal $T_{E1}$ so that the encoding operations are concatenated.

In a practical implementation of a multiple unicast transmission sequence according to the present invention any number of receiver devices could be used. In this implementation the latencies associated with each receiver device are equal. Despite there being multiple unicast transmissions the latency associated with each of the receiver devices is equal to the latency that would be associated with a unicast transmission to a single receiving device. The offset $\Delta T$ between the sampled portions of the source data is used to reduce the latency. The second receiver device has its latency reduced by $\Delta T$ and in the third receiver device the latency is reduced by $2\Delta T$.

The transmitter may be capable of sampling the datastream according to multiple mechanisms: for example with different sampling rates and/or different numbers of bits per sample. The transmitter may be capable of encoding the sampled datastream according to multiple mechanisms: for example with different numbers of bits per symbol or different levels of error coding. The transmitter may select a sampling mechanism and/or an encoding mechanism so that it can transmit the required number of portions of the data stream (i.e. a number equal to the number of receivers) in the time taken to consume a portion of the datastream at a receiver, for example by playing that portion out at the rate at which it occurred in the original datastream.

The present invention can also be applied to situations where there is more than one stream of data. Examples of such situations include the transmission of two stereo channels over Bluetooth to two speakers or to wireless headphones with left and right speakers. The transmission of multiple streams of synchronous data is commonly used in "surround sound" systems, where multiple data streams are transmitted to respective speakers. A further application is the transmission of a synchronous audio and video stream, where the audio and video streams are sent to separate devices.

When transmitting multiple synchronous streams of data it is often desirable to reduce the latency associated with the transmission. In a video transmission of a live event, for example, high latencies may be unacceptable. Offsetting the sampling of one data stream from the sampling of another data stream in accordance with the present invention can lead to a reduction in latency at the receiver device.

Figure 6:
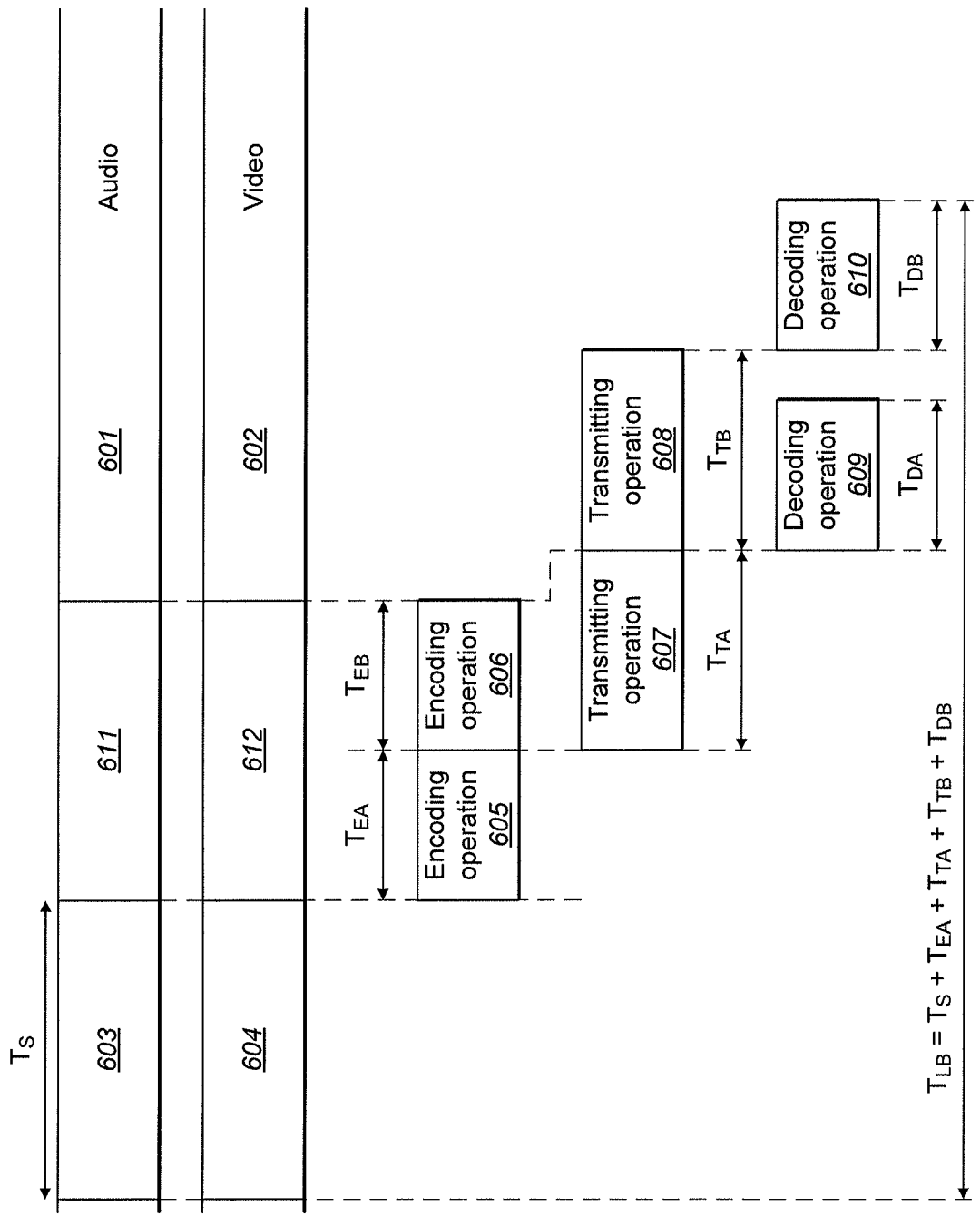
FIG. 6 shows an example of a transmission sequence of portions of data from two data streams to two receiver devices.

FIG. 6 shows an example of transmitting a first data stream to a first receiver device and a second, synchronous data stream to a second receiver device according to a known method. In this method a first data stream (stream A) 601 and a second data stream (stream B) 602 are sampled simultaneously for a time $T_S$ to produce a first and second sampled portion 603 and 604 respectively. The first data stream could be, for example an audio stream and the second data stream could be, for example a video stream. The first sampled portion 603 is then encoded to produce a first encoded portion, or packet $A_1$. The first encoding operation 605 takes time $T_{EA}$. The second sampled portion 604 is then encoded to produce a second encoded portion, or packet $B_1$. The second encoding operation 606 takes time $T_{EB}$. The first encoded portion is then transmitted by a first transmitting operation to a first receiving device (device A) to produce a first transmitted portion. The first transmitting operation 607 takes time $T_{TA}$. After the completion of the first transmitted operation the second encoded portion is transmitted by a second transmitting operation 608 to a second receiving device (device B) to produce a second transmitted portion. The transmitting operation 608 takes time $T_{TB}$. Once the first transmitted portion is received by the first receiving device it is decoded by a first decoding operation 609 taking time $T_{DA}$. Once the second transmitted portion is received by the second receiving device it is decoded by a second decoding operation 610 taking time $T_{DB}$. The process of sampling, encoding, transmitting and decoding is then repeated for the portions 611 and 612 which are contiguous to portions 603 and 604 respectively.

In this example the transmission and encoding operations are to overlap in time. With reference to FIG. 6 it can be seen that the latencies associated with the transmission of overlapping sampled data portions 603 and 604, given by $T_{LA}$ and $T_{LB}$ respectively, are:

$$T_{LA}=T_S+T_{EA}+T_{TA}+T_{DA}$$

$$T_{LB}=T_S+T_{EA}+T_{TA}+T_{TB}+T_{DB} \text{ if } T_{EB}<T_{TA}$$

$$T_{LB}=T_S+T_{EA}+T_{EB}+T_{TB}+T_{DB} \text{ if } T_{EB}>T_{TA}$$

In the example transmission sequence shown in FIG. 6, neither the audio data portion 603 nor the video data portion 604 can be played at either receiver device until both devices have received and decoded their respective data portions. In this example data stream A is encoded before data stream B, which means the effective latency of both devices is equal to $T_{LB}$; that is, device A cannot play its received data portion until device B has received and decoded its data portion, otherwise the data streams will no longer be synchronous. Note that with this arrangement the latency associated with device B is larger than if there were only one data stream. Alternatively, if data stream B is encoded before data stream A, the latencies will be given by the following equations:

$$T_{LA}=T_S+T_{EB}+T_{TB}+T_{TA}+T_{DA} \text{ if } T_{EA}<T_{TB}$$

$$T_{LA}=T_S+T_{EB}+T_{EA}+T_{TA}+T_{DA} \text{ if } T_{EA}>T_{TB}$$

$$T_{LB}=T_S+T_{EB}+T_{TB}+T_{DB}$$

In this case device B will not be able to play its data portion until device A has received and decoded its data portion, and so the effective latencies of both devices will be equal to $T_{LA}$.

Figure 7:
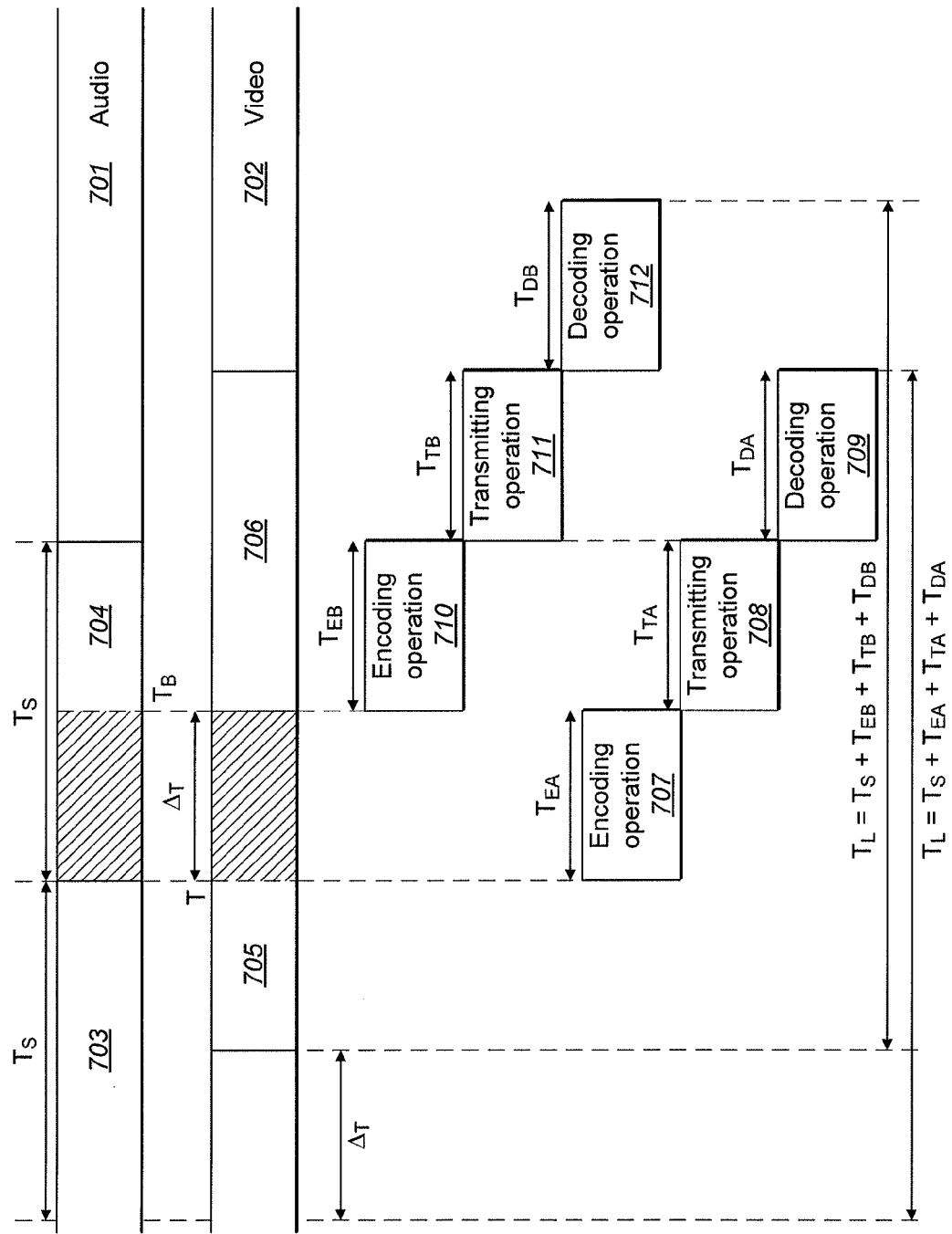
FIG. 7 shows an example of a transmission sequence of portions of data from two data streams to two receiver devices according to an aspect of the present invention.

FIG. 7 is an example of transmitting two synchronous data streams by offsetting the sampling of one data stream relative to another in accordance with an embodiment of the present invention. A first data stream 701 is to be transmitted to a first receiver device (device A) and a second data stream 702 is to be transmitted to a second receiver device (device B). The first data stream 701 is sampled to produce contiguous sampled portions 703 and 704, each of duration $T_S$. The second data stream 702 is sampled to produce contiguous sampled portions 705 and 706, each of duration $T_S$. The start of sampled portion 705 is offset relative to the start of sampled portion 703 by a time $\Delta T$, and hence the start of sampled portion 706 is offset relative to the start of sampled portion 704 by a time $\Delta T$. The sampled portion 703 is encoded by an encoding operation 707 to produce an encoded portion. The duration of the encoding operation is $T_{EA}$. The encoded portion is then transmitted to a first receiver device (device A) by a transmitting operation 708 to produce a transmitted portion. The duration of the transmission operation is $T_{TA}$. Once the transmitted portion is received by the first receiving device, it is decoded by a first decoding operation 709 to produce a first decoded portion. The decoding operation takes time $T_{DA}$. The sampled portion 705 is encoded by an encoding operation 710 to produce an encoded portion. The duration of the encoding operation is $T_{EB}$. The encoded portion is then transmitted to a second receiver device (device B) by a transmitting operation 711 to produce a transmitted portion. The duration of the transmission operation is $T_{TB}$. Once the transmitted portion is received by the second receiving device, it is decoded by a second decoding operation 712 to produce a second decoded portion. The decoding operation takes time $T_{DB}$. This process of encoding, transmitting and decoding is repeated for the sampled portions 704 and 706.

Offsetting the sampling of one data stream relative to another data stream has advantages over the known method when the transmitted data is to be streamed in real-time by the receiver devices. This will be illustrated by way of example by supposing that stream 701 is an audio stream and 702 is a video stream. The advantage of offsetting the sampling of one data stream relative to another data stream is that it allows one device to begin playing a decoded portion of data before the other device has decoded its corresponding portion of data. For example, device A can begin playing decoded data corresponding to sampled portion 704 before device B has finished decoding data corresponding to sampled portion 706. This is because as device A begins playing data corresponding to portion 704, device B will be playing data corresponding to sampled portion 705, which has been decoded prior to device A decoding portion 704. By the time device A has played out data to the point corresponding to time $T_B$, device B will have received and decoded portion 706.

For a further illustration, consider the shaded overlapping sections of data portions 704 and 705, which overlap from time T. The latency associated with the shaded portion of 704 is equal to:

$$T_{\overline{LA}}=T_S+T_{EA}+T_{TA}+T_{DA}$$

The latency associated with the shaded portion of 705 is equal to:

$$T_{\overline{LB}}=\Delta T+T_{EB}+T_{TB}+T_{DB}+(T_S-\Delta T)=T_S+T_{EB}+T_{TB}+T_{DB}$$

The $\Delta T$ term arises from having to sample the overlapping section of portion 705 for a duration of time $\Delta T$. The term $(T_S-\Delta T)$ arises because the receiving device has to play out the decoded data corresponding to portion 705 for a time $(T_S-\Delta T)$ before it can play out the data corresponding to time T of portion 705.

In an ideal implementation the sampling time offset $\Delta T$ can be chosen such that the latency associated with each data stream is equal to the maximum of the individual latencies that would occur if each receiver device were the only device. The value of $\Delta T$ to be applied to achieve this effect will depend on the encoding, transmission and decoding times of the data streams. FIG. 7 is an example of this ideal implementation, and so the latency of this system is effectively equal to the greater of the two individual latencies $T_{\overline{LA}}$ and $T_{\overline{LB}}$.

In the example implementation of FIG. 7 the encoding and transmission operations can overlap but the present invention may also be applied to systems in which the encoding and transmission operations cannot overlap. Similarly the present invention can be applied to situations where the transmission and decoding operations cannot overlap. The present invention may be applied to situations where three or more data streams are to be transmitted. The invention can be applied to situations in which the data streams are of the same data type, for example both data streams are audio streams.

The present invention relates to a method that can be used to reduce at least the worst case latency in a multiple unicast transmission. Such a method provides a way of transmitting source data from a device to a sub-group of receiver devices on a communication network. The method is particularly useful in cases where multicast transmission is unavailable, such as, for example, in Bluetooth communication networks.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of transferring a data stream as multiple unicast transmissions to multiple receivers, the method comprising:

sampling a first portion of the data stream to form a first sample dataset, encoding the first sample dataset to form a first encoded dataset and transmitting the first encoded dataset as a first unicast transmission to a first one of the receivers;

sampling a second portion of the data stream to form a second sample dataset, encoding the second sample dataset to form a second encoded dataset and transmitting the second encoded dataset as a second unicast transmission to a second one of the receivers;

and performing at least part of the step of sampling the second portion of the datastream whilst the first sample dataset is being encoded or the first encoded dataset is being transmitted.

2. The method as claimed in claim 1, wherein the start of the second portion of the datastream is located within the first portion of the datastream.

3. The method as claimed in claim 1, wherein each said portion of the datastream is a continuous portion.

4. The method as claimed in claim 1, further comprising, subsequent to the step of sampling the second portion of the datastream: sampling a third portion of the data stream to form a third sample dataset, encoding the third sample dataset to form a third encoded dataset and transmitting the third encoded dataset to the first one of the receivers; sampling a fourth portion of the data stream to form a fourth sample dataset, encoding the fourth sample dataset to form a fourth encoded dataset and transmitting the fourth encoded dataset to the second one of the receivers.

5. The method as claimed in claim 4, further comprising, performing at least part of the step of sampling the third portion of the datastream whilst the second sample dataset is being encoded or the second encoded dataset is being transmitted.

6. The method as claimed in claim 4, further comprising, performing at least part of the step of sampling the fourth portion of the datastream whilst the third sample dataset is being encoded or the third encoded dataset is being transmitted.

7. The method as claimed in claim 4, wherein the third portion of the datastream overlaps the second portion.

8. The method as claimed in claim 4, wherein the fourth portion of the datastream overlaps the third portion.

9. The method as claimed in claim 4, wherein the third portion of the datastream starts at the end of the first portion of the datastream and the fourth portion of the datastream starts at the end of the second portion of the datastream.

10. The method as claimed in claim 1, further comprising, transmitting the encoded datasets by unicast transmissions.

11. The method as claimed in claim 10, further comprising, transmitting in accordance with a protocol in which a receiver of one of the unicast transmissions indicates whether it has received that unicast transmission correctly.

12. The method as claimed in claim 1, further comprising, transmitting the datastream to n receivers and the duration of each portion of the datastream is at least equal to the time taken to transmit an encoded sampled dataset representing a portion of that duration to all n receivers.

13. The method as claimed in claim 12, further comprising, sampling the datastream according to multiple sampling methods and/or encoding sampled datasets according to multiple encoding methods and selecting a sampling method and/or an encoding method for use in order that the duration of each portion of the datastream is at least equal to the time taken to transmit an encoded sampled dataset representing such a portion to all n receivers.

14. A method for transferring multiple data streams as multiple unicast transmissions from a transmitter to multiple receivers, comprising:

sampling a first portion of a first data stream to form a first sampled dataset, encoding the first sample dataset to form a first encoded dataset and transmitting the first encoded dataset as a first unicast transmission to a first one of the receivers;

sampling a second portion of a second data stream to form a second sampled dataset, encoding the second sample dataset to form a second encoded dataset and transmitting the second encoded dataset as a second unicast transmission to a second one of the receivers;

wherein at least part of the step of sampling the second portion of the second data stream is performed whilst the first sample dataset is being encoded or the first encoded dataset is being transmitted.

15. The method as claimed in claim 14, further comprising subsequent to the step of sampling the second portion of the second data stream:

sampling a third portion of the first data stream to form a third sample dataset, encoding the third sample dataset to form a third encoded dataset and transmitting the third encoded dataset to the first one of the receivers;

sampling a fourth portion of the second data stream to form a fourth sample dataset, encoding the fourth sample dataset to form a fourth encoded dataset and transmitting the fourth encoded dataset to the second one of the receivers.

16. The method as claimed in claim 15, wherein at least part of the step of sampling the third portion of the first data stream is performed whilst the second sample dataset is being encoded or the second encoded dataset is being transmitted.

17. The method as claimed in claim 15, the wherein, at least part of the step of sampling the fourth portion of the second data stream is performed whilst the third sample dataset is being encoded or the third encoded dataset is being transmitted.

18. The method as claimed in claim 15, wherein the third portion and the second portion overlap in time.

19. The method as claimed in claim 15, wherein the fourth portion and the third portion overlap in time.

20. The method as claimed in claim 15, wherein the third portion of the first datastream starts at the end of the first portion of the first datastream and the fourth portion of the second datastream starts at the end of the second portion of the second datastream.

* * * * *